US007237432B2

(12) United States Patent
Inagaki et al.

(10) Patent No.: US 7,237,432 B2
(45) Date of Patent: Jul. 3, 2007

(54) VANE PUMP, METHOD FOR ADJUSTING PUMP FLOW RATE OF VANE PUMP AND FUEL VAPOR LEAKAGE CHECK MODULE HAVING VANE PUMP

(75) Inventors: Koichi Inagaki, Okazaki (JP); Masao Kano, Gamagori (JP); Mitsuyuki Kobayashi, Gamagori (JP)

(73) Assignee: Denso Corporation, Kariya, Aichi-pref. (JP)

( * ) Notice: Subject to any disclaimer, the term of this patent is extended or adjusted under 35 U.S.C. 154(b) by 520 days.

(21) Appl. No.: 10/923,777

(22) Filed: Aug. 24, 2004

(65) Prior Publication Data

US 2005/0047936 A1 Mar. 3, 2005

(30) Foreign Application Priority Data

Aug. 25, 2003 (JP) ............................ 2003-300230
Apr. 20, 2004 (JP) ............................ 2004-124150

(51) Int. Cl.
*G01M 19/00* (2006.01)
*F01C 1/00* (2006.01)
*F01C 19/10* (2006.01)

(52) U.S. Cl. .................... 73/118.1; 418/131; 418/134; 418/259

(58) Field of Classification Search ............... 73/118.1; 418/131, 133, 134, 152, 153, 259, 266–268
See application file for complete search history.

(56) References Cited

U.S. PATENT DOCUMENTS 2,466,623 A * 4/1949 Tucker et al. ............... 418/149
3,136,260 A * 6/1964 Eickmann ................... 418/173
3,498,233 A * 3/1970 Dillberg ..................... 417/259
5,575,629 A * 11/1996 Olson et al. ................ 417/405
5,816,297 A * 10/1998 Olson et al. .................. 141/59
5,890,474 A 4/1999 Schnaibel et al.
7,036,359 B2 * 5/2006 Hayakawa et al. ........ 73/118.1
7,114,931 B2 * 10/2006 Wilk et al. .................. 418/259
2005/0022588 A1 * 2/2005 Hayakawa et al. ........ 73/118.1
2006/0191330 A1 * 8/2006 Hayakawa et al. ........ 73/118.1

FOREIGN PATENT DOCUMENTS

JP 03199686 A * 8/1991

* cited by examiner

*Primary Examiner*—Hezron Williams
*Assistant Examiner*—John Fitzgerald
(74) *Attorney, Agent, or Firm*—Nixon & Vanderhye P.C.

(57) ABSTRACT

A rotor includes a plurality of vanes and is connected to a rotatable shaft of a motor arrangement. A casing includes a pump chamber and elongated holes. The pump chamber receives the rotor in such a manner that the rotor is eccentric to the pump chamber. Each elongated hole penetrates through the casing and has an elongated cross section. A major axis of the elongated cross section of each elongated hole extends in a direction of eccentricity of the rotor relative to the pump chamber. Each bolt is received through a corresponding elongated hole of the casing and is threadably engaged with a mount to connect the casing to the mount. The casing holds each bolt in a minor axial direction of the elongated cross section of the corresponding elongated hole to limit substantial movement of the male threaded screw member in the minor axial direction of the elongated hole.

7 Claims, 12 Drawing Sheets

VANE PUMP, METHOD FOR ADJUSTING PUMP FLOW RATE OF VANE PUMP AND FUEL VAPOR LEAKAGE CHECK MODULE HAVING VANE PUMP

CROSS REFERENCE TO RELATED APPLICATION

This application is based on and incorporates herein by reference Japanese Patent Application No. 2003-300230 filed on Aug. 25, 2003 and Japanese Patent Application No. 2004-124150 filed on Apr. 20, 2004.

BACKGROUND OF THE INVENTION

1. Field of the Invention

The present invention relates generally to a vane pump, and specifically to a vane pump, which can be effectively used in, for example, a fuel vapor leakage check module that checks fuel vapor leakage.

2. Description of Related Art

A known vane pump compresses and discharges fluid by rotating a rotor, which includes vanes and is eccentrically received in a pump chamber of a casing in such a manner that the rotor is connected to a rotatable shaft of a motor. Japanese Unexamined Patent Publication No. 10-90107, which corresponds to U.S. Pat. No. 5,890,474, discloses one such vane pump, which is used in a fuel vapor leakage check module that checks leakage of fuel vapor from a fuel tank and which depressurizes or pressurizes the interior of the fuel tank. In this type of vane pump, a pump flow rate is important since the pump flow rate has a significant influence on the performance of the fuel vapor leakage check module. The pump flow rate can be adjusted by adjusting an amount of deviation of the rotational center of the rotor relative to the center of the pump chamber (i.e., a degree of eccentricity of the rotor relative to the pump chamber).

In one previously proposed vane pump, bolts are installed through a casing and are threadably engaged with a mount of a motor, so that the casing is securely connected to the mount by the bolts. The degree of eccentricity of the rotor and thereby the pump flow rate of the vane pump may be adjusted by loosening the bolts and then moving the casing relative to the mount.

However, the holes of the casing, which receives the bolts, are formed as cylindrical loose holes to allow relative movement of the casing relative to the mount. Thus, the position of the casing relative to the mount can be relatively easily displaced in a radial direction of each loose hole. Therefore, it takes a relatively long time to find an appropriate position of the casing relative to the mount, at which a desired pump flow rate is achieved.

Thus, it is an objective of the present invention to provide a vane pump, which allows minimization of the time required to adjust a pump flow rate of the vane pump. It is another objective of the present invention to provide a method for adjusting a pump flow rate of such a vane pump. It is another objective of the present invention to provide a fuel vapor leakage check module having such a vane pump.

To achieve the objectives of the present invention, there is provided a vane pump that includes a motor arrangement, a rotor, a casing and at least one male threaded screw member. The motor arrangement includes a rotatable shaft and a support that rotatably supports the rotatable shaft. The rotor includes a plurality of vanes and is connected to the rotatable shaft. The casing includes a pump chamber and at least one elongated hole. The pump chamber receives the rotor in such a manner that the rotor is eccentric to the pump chamber. Each of the at least one elongated hole penetrates through the casing in a direction parallel to the rotatable shaft and has an elongated cross section. A major axis of the elongated cross section of each of the at least one elongated hole extends in a direction of eccentricity of the rotor relative to the pump chamber. Each of the at least one male threaded screw member is received through a corresponding one of the at least one elongated hole of the casing and each of which is threadably engaged with the support to connect the casing to the support. The casing holds each of the at least one male threaded screw member in a minor axial direction of the elongated cross section of a corresponding one of the at least one elongated hole to limit substantial movement of the male threaded screw member in the minor axial direction of the corresponding one of the at least one elongated hole.

To achieve the objectives of the present invention, there is also provided a method for adjusting a pump flow rate of the vane pump. According to the method, the pump flow rate of the vane pump is monitored, and at the same time, the casing is moved relative to the support in a state where the at least one male threaded screw member is loosened. Then, a position of the casing relative to the support is determined based on a result of the monitoring of the pump flow rate of the vane pump.

To achieve the objectives of the present invention, there is also provided a fuel vapor leakage check module for checking leakage of fuel vapor from a fuel tank. The fuel vapor leakage check nodule includes the vane pump. The fuel vapor leakage check module checks leakage of fuel vapor from the fuel tank through depressurization or pressurization of an interior of the fuel tank by the vane pump.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1-10B.

Figure 2:
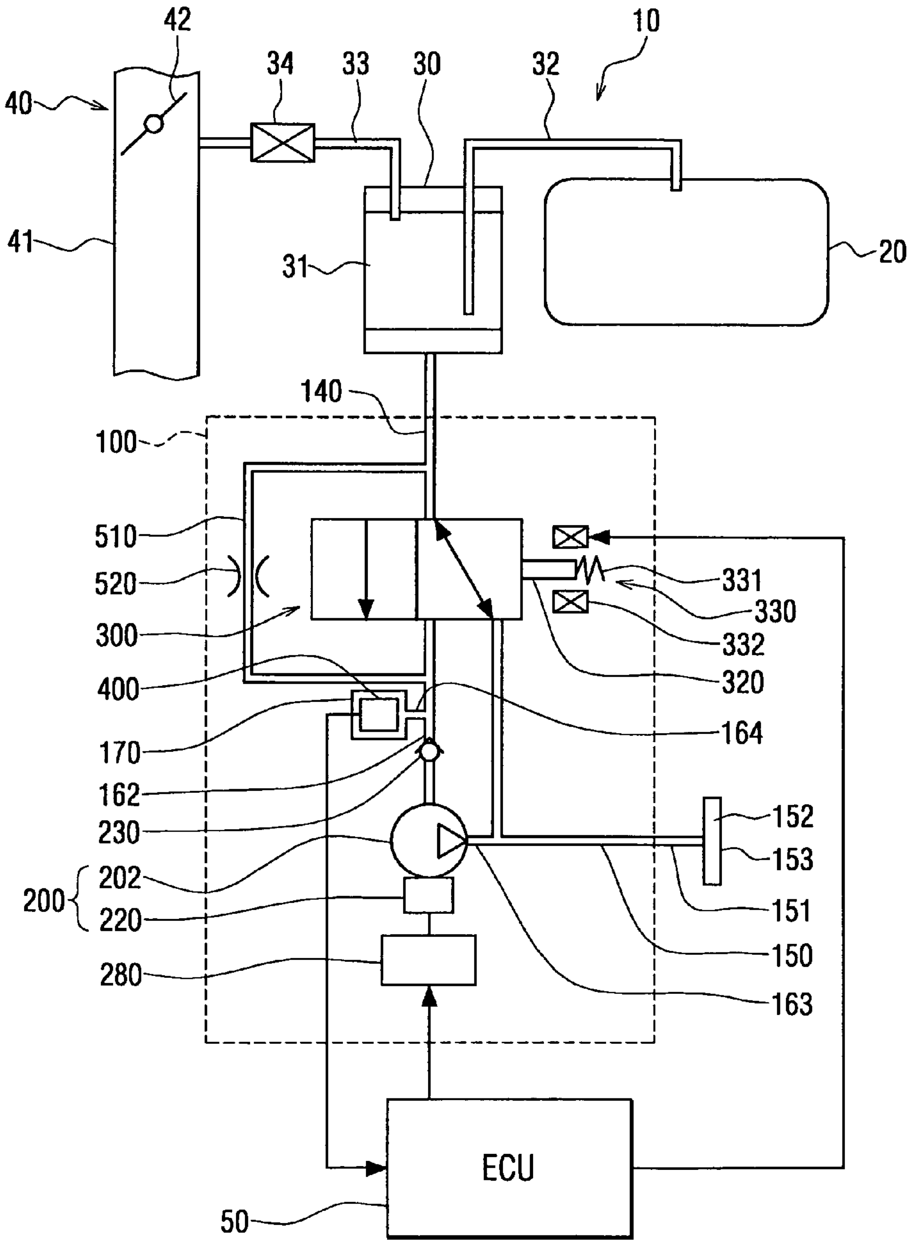
FIG. 2 is a schematic view of a check system in which a check module of the first embodiment is installed.

A fuel vapor leakage check system (hereinafter simply referred to as "check system") of a first embodiment, which includes a fuel vapor leakage check module (hereinafter simply referred to as "check module") is shown in FIG. 2.

The check system 10 includes the check module 100, a fuel tank 20, a canister 30, an air intake apparatus 40 and an ECU 50.

Figure 3:
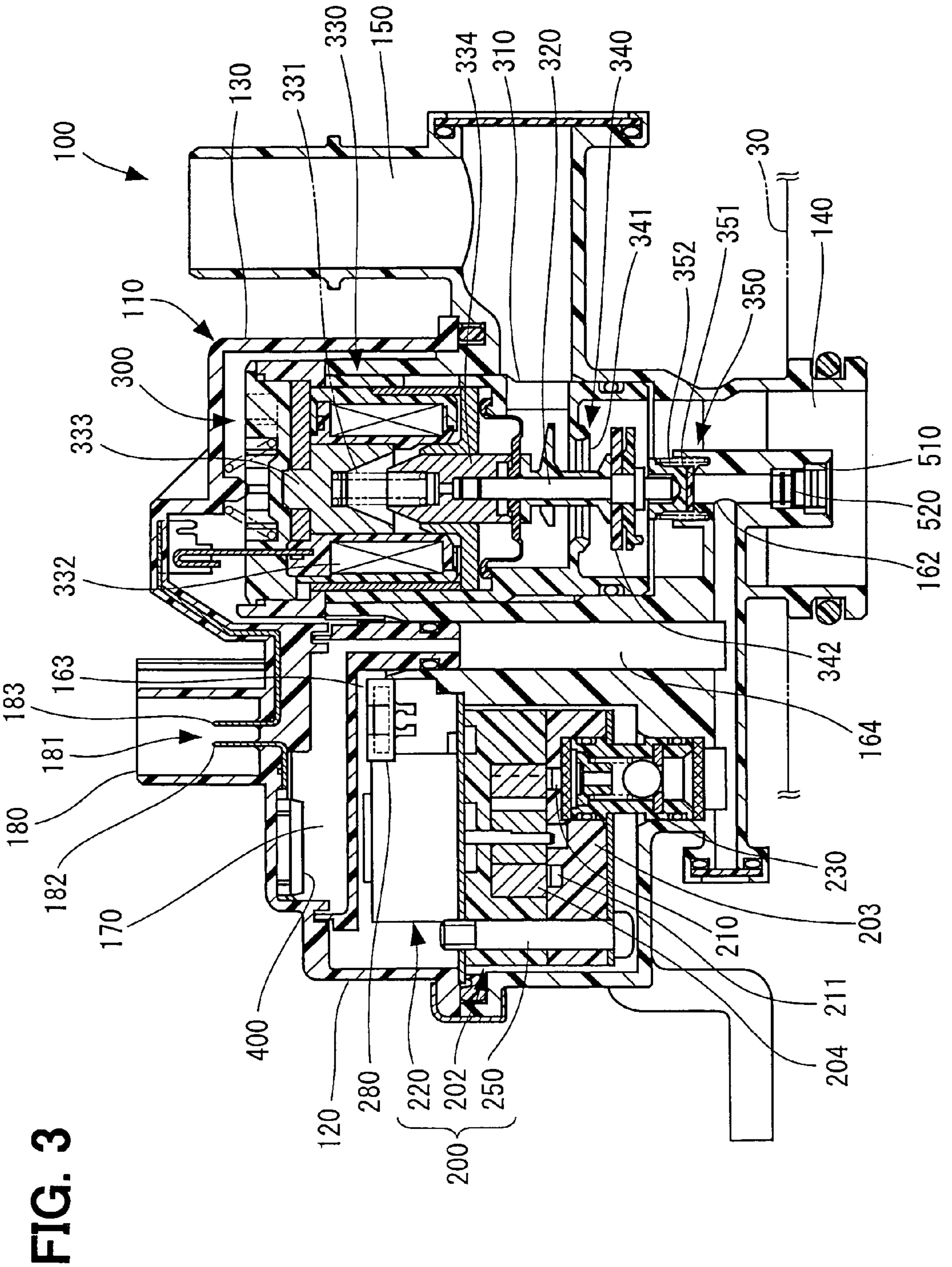
FIG. 3 is a cross sectional view of the check module of the first embodiment.

As shown in FIG. 3, the check module 100 includes a housing 110, a vane pump 200, a switching valve 300 and a pressure sensor 400.

The housing 110 includes a pump receiving portion 120 and a switching valve receiving portion 130. The pump receiving portion 120 receives the vane pump 200, and the switching valve receiving portion 130 receives the switching valve 300. The housing 110 further includes a canister port 140 and an atmosphere port 150. One end of the canister port 140 is connected to one end of the atmosphere port 150 through the switching valve 300. The other end of the canister port 140, which is opposite from the switching valve 300, is connected to the canister 30. The other end of the atmosphere port 150, which is opposite from the switching valve 300, is connected to one end of an atmosphere passage 151, as shown in FIG. 2. The other end of the atmosphere passage 151 has an open end 153, which is located on a side opposite from the check module 100 and is connected to an air filter 152. Thus, the other end of the atmosphere passage 151 is opened to the atmosphere on the side opposite from the check module 100.

As shown in FIG. 3, the housing 110 further includes a pump passage 162, an outlet passage 163, a pressure communicating passage 164, a sensor chamber 170 and an orifice passage 510. One end of the pump passage 162 is connected to an intake opening 210 of a pump arrangement 202 of the vane pump 200 through a check valve 230 of the pump arrangement 202. The other end of the pump passage 162, which is opposite from the check valve 230, is connected to the canister port 140 and also to the atmosphere port 150 through the switching valve 300. The outlet passage 163 connects between an outlet opening 211 of the pump arrangement 202 and the atmosphere port 150. One end of the pressure communicating passage 164 is connected to an intermediate portion of the pump passage 162, and the other end of the pressure communicating passage 164, which is opposite from the pump passage 162, is connected to the sensor chamber 170. The pressure sensor 400 is arranged in the sensor chamber 170. One end of the orifice passage 510 is connected to the other end of the pump passage 162, and the other end of the orifice passage 510, which is opposite from the pump passage 162, is opened in the interior of the canister port 140. Thus, the orifice passage 510 is always communicated with the canister port 140 and the pump passage 162. An orifice 520 is arranged in an intermediate portion of the orifice passage 510. An inner diameter of the orifice 520 corresponds to an opening diameter, which allows leakage of air that includes fuel vapor generated in the fuel tank 20.

A connector 180 is arranged in the pump receiving portion 120 of the housing 110. A terminal assembly 181 of the connector 180 is connected to a coupler (not shown), to which electric power is supplied from a power source (not shown) through the ECU 50. The terminal assembly 181 of the connector 180 includes a terminal 182, which is connected to the pressure sensor 400, and a terminal 183, which is connected to a coil assembly 332 of the switching valve 300. The terminal assembly 181 further includes a terminal (not shown), which is connected to a control circuit unit 280 of a motor arrangement 220 of the vane pump 200.

The vane pump 200 includes the pump arrangement 202, the motor arrangement 220 and bolts (serving as male threaded screw members) 250.

Figure 1:
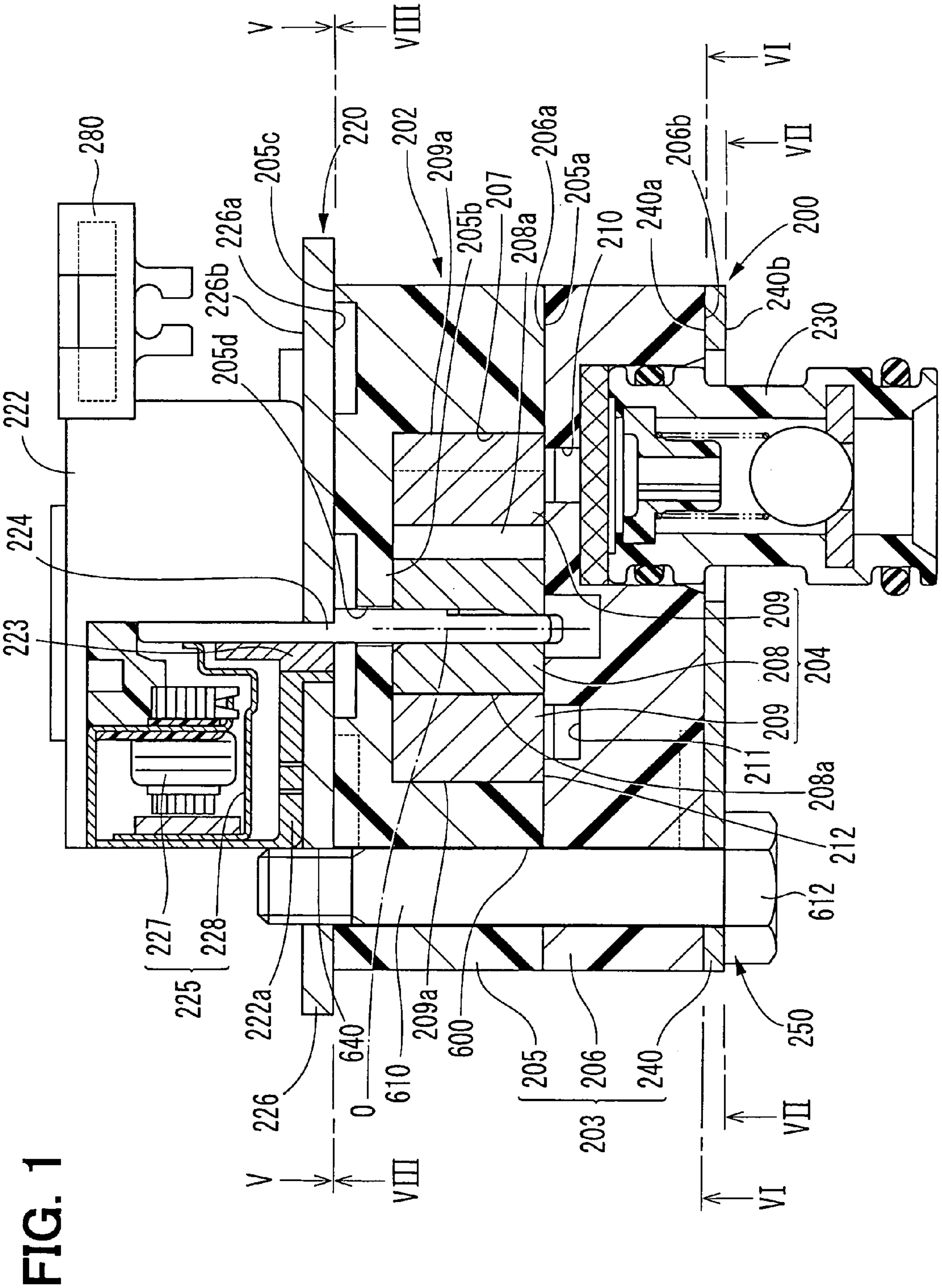
FIG. 1 is a cross sectional view of a vane pump according to a first embodiment of the present invention.

The pump arrangement 202 includes a casing 203, a rotor 204 and the check valve 230. The casing 203 is arranged in the pump receiving portion 120. As shown in FIG. 1, the casing 203 includes a cam ring 205, a plate (serving as a cover member) 206 and a protective member 240, which are connected together to form the casing 203. The cam ring 205 is made of resin and has opposed first and second ends. The cam ring 205 has an opening 212 at the first end and a base wall 205*b* at the second end. A generally cylindrical pump chamber 207 is defined in the cam ring 205 and is communicated with the opening 212 of the cam ring 205. The plate 206 is made of resin and is formed as a thick flat plate. The plate 206 has opposed first and second ends. A second end surface 206*a* of the plate 206, which is located in the second end of the plate 206, makes flat surface contact with a first end surface 205*a* of the cam ring 205, which is located in the first end of the cam ring 205, so that the opening 212 of the cam ring 205 is covered by the plate 206. The protective member 240 is made of metal and is formed as a thin flat plate. The protective member 240 has opposed first and second end surfaces 240*b*, 240*a*. The second end surface 240*a* of the protective member 240 makes flat surface contact with the first end surface 206*b* of the plate 206. Thus, the protective member 240 is located at a first end of the casing 203. The cam ring 205, the plate 206 and the protective member 240, which constitute the casing 203, are integrally connected to the mount 226 by the bolts 250.

The plate 206 includes the intake opening 210 and the outlet opening 211 of the pump arrangement 202. The intake opening 210 opens in the first end surface 206*b* of the plate 206 and also opens in the second end surface 206*a* of the plate 206 at a position that is axially opposed to the pump chamber 207. The outlet opening 211 opens in an outer peripheral surface of the plate 206 and also opens in the second end surface 206*a* of the plate 206 at a position that is axially opposed to the pump chamber 207.

The rotor 204 is received in the pump chamber 207 and is located between the base wall 205*b* of the cam ring 205 and the plate 206. The rotor 204 includes a rotor shaft 208 and a plurality of vanes 209. A rotational center of the rotor shaft 208 is eccentric to a center of the pump chamber 207, and the rotor shaft 208 rotates about its center, i.e., a central axis O. Each vane 209 projects radially and is radially slidably received in a corresponding groove 208*a* of the rotor shaft 208. A radially outer edge 209*a* of each vane 209 slidably engages an inner peripheral wall of the cam ring 205 upon application of a centrifugal force generated by rotation of the rotor shaft 208. The air, which is drawn into the pump chamber 207 through the intake opening 210 at the time of rotating the rotor 204, is compressed by the vanes 209 and is then discharged to the outlet passage 163 through the outlet opening 211. In this way, the pump arrangement 202 depressurizes the interior of the fuel tank 20 through the canister 30.

The check valve 230 is inserted into the intake opening 210 from the first end surface 206*b* side of the intake opening 210, and a protruding end of the check valve 230, which protrudes from the intake opening 210, is connected to the pump passage 162. The check valve 230 is opened when the rotor 204 is rotated. The check valve 230 is closed when the rotor 204 is not rotated.

In this embodiment, the motor arrangement 220 is made as a contactless direct current brushless motor. The motor arrangement 220 includes a case member 222, a bearing 223, a rotatable shaft 224, an electric drive unit 225, the control circuit unit 280 and a mount (a second end member) 226. The case member 222 is made of metal and is formed into a box shape. The case member 222 is received in the pump receiving portion 120. The case member 222 receives the bearing 223 and the electric drive unit 225. The bearing 223 rotatably receives one end of the rotatable shaft 224 while substantially preventing radial movement of the rotatable shaft 224. The other end of the rotatable shaft 224 penetrates through the base wall 205*b* of the cam ring 205 and is securely connected to the rotor shaft 208 in a coaxial manner in the pump chamber 207. The electric drive unit 225 shifts the energization position of a coil assembly 227, so that a rotator 228, which is coaxially installed to the rotatable shaft 224, is rotated by the electric drive unit 225. The control circuit unit 280 is arranged outside of the case member 222 and is connected to the coil assembly 227 of the electric drive unit 225. Through control of the energization position of the coil assembly 227 by the control circuit unit 280, the rotatable shaft 224, which is connected to the rotator 228, is rotated at a predetermined rpm, so that the rotor 204, which is connected to the rotatable shaft 224, is also rotated at a predetermined rpm. The mount 226 is made of metal and is formed as a thin flat plate. The mount 226 has opposed first and second end surfaces 226*a*, 226*b* and is secured to a base wall 222*a* of the case member 222 at the second end surface 226*b*. The first end surface 226*a* of the mount 226 makes flat surface contact with a second end surface 205*c* of the cam ring 205, which is located in the second end of the cam ring 205 where the base wall 205*b* is formed. The case member 222, the bearing 223 and the mount 226 cooperate together to form a support of the present invention.

As shown in FIG. 3, the switching valve 300 includes a valve body 310, a closure valve 340, a reference valve 350, a valve shaft member 320 and an electromagnetic drive unit 330.

The valve body 310 is held in the switch valve receiving portion 130. The closure valve 340 includes a first valve seat 341 and a washer 342. The first valve seat 341 is made integrally in the valve body 310. The washer 342 is installed to an intermediate portion of the valve shaft member 320. The reference valve 350 include a second valve seat 351 and a valve cap 352. The second valve seat 351 is formed integrally in the switching valve receiving portion 130. The valve cap 352 is installed to one end of the valve shaft member 320 located on a canister 30 side of the valve shaft member 320. The valve shaft member 320 is driven by the electromagnetic drive unit 330. The electromagnetic drive unit 330 includes a spring 331, the coil assembly 332, a stationary core 333 and a movable core 334. The spring 331 urges the valve shaft member 320 against the second valve seat 351. The coil assembly 332 is connected to the ECU 50. Power supply to the coil assembly 332 is enabled or disabled by the ECU 50. Each of the stationary core 333 and the movable core 334 is made of a magnetic material. The stationary core 333 and the movable core 334 are opposed to each other in the axial direction of the valve shaft member 320. The movable core 334 is installed to the other end of the valve shaft member 320, which is opposite from the canister 30.

When electric current is not supplied to the coil assembly 332, a magnetic attractive force is not generated between the stationary core 333 and the movable core 334. Thus, the valve shaft member 320 is moved in a direction (a downward direction in FIG. 3) away from the stationary core 333 by the urging force of the spring 331, so that the valve cap 352 is seated against the second valve seat 351, and the washer 342 is lifted away from the first valve seat 341. In this way, the canister port 140 and the atmosphere port 150 are communicated to one another. Also, the communication of the pump passage 162 to the canister port 140 and to the atmosphere port 150 is disconnected in the path, which bypasses the orifice passage 510. When electric current is supplied to the coil assembly 332, a magnetic attractive force is generated between the stationary core 333 and the movable core 334. Thus, the valve shaft member 320 is moved against the urging force of the spring 331 in a direction (in an upward direction in FIG. 3) toward the stationary core 333, so that the valve cap 352 is lifted away from the second valve seat 351, and the washer 342 is seated against the first valve seat 341. In this way, the pump passage 162 and the canister port 140 are communicated to one another via the path, which bypasses the orifice passage 510, and the canister port 140 and the atmosphere port 150 are discommunicated from one another.

The pressure sensor 400 is arranged in the sensor chamber 170. The pressure sensor 400 measures a pressure in the sensor chamber 170 and outputs a signal, which corresponds to a measured pressure of the sensor chamber 170, to the ECU 50. The sensor chamber 170 communicates with the pump passage 162 through the pressure communicating passage 164. Thus, the pressure, which is measured by the pressure sensor 400, is substantially the same as a pressure in the pump passage 162.

As shown in FIG. 2, the canister 30 is connected to the fuel tank 20 through a tank passage 32. The canister 30 includes an adsorbent 31, such as active carbon. The fuel vapor, which is generated in the fuel tank 20, is adsorbed by the adsorbent 31 of the canister 30. Therefore, a concentration of fuel vapor, which is contained in the air discharged from the canister 30, becomes equal to or less than a predetermined value. The air intake apparatus 40 includes an air intake pipe 41, which is connected to an air intake system of the engine. A throttle valve 42 is arranged in the intake pipe 41 and adjusts a flow rate of intake air in the intake pipe 41. The air intake pipe 41 and the canister 30 are connected to one another through a purge passage 33. A purge valve 34 is arranged in the purge passage 33. The purge valve 34 opens and closes the purge passage 33 based on a command transmitted from the ECU 50.

The ECU 50 has a microcomputer, which includes a CPU, a ROM and a RAM (not shown). The ECU 50 controls the check module 100 and the various corresponding parts of the vehicle, in which the check module 100 is installed. Various signals are supplied to the ECU 50 from the pressure sensor 400 and also from sensors of the various corresponding parts of the vehicle. The ECU 50 controls the various corresponding parts of the vehicle based on the various signals upon execution of a predetermined control program, which is stored in the ROM. Operation of the motor arrangement 220 and operation the switching valve 300 are controlled by the ECU 50.

Next, operation of the check module 100 of the check system 10 will be described.

A check operation is not performed through the check module 100 until a predetermined time period elapses from the time of stopping the engine, which is installed in the vehicle. Thus, before the check operation, electric current is not supplied to the coil assembly 332 of the switching valve 300. Therefore, the canister port 140 and the atmosphere port 150 are communicated to one another. As a result, the air, which includes fuel vapor generated in the fuel tank 20, passes through the canister 30, in which the fuel vapor is removed from the air. Then, the air, from which the fuel vapor is removed by the canister 30, is released to the atmosphere through the open end 153 of the atmosphere passage 151.

(1) When the predetermined time period elapses from the time of stopping the engine, an atmospheric pressure is measured through the pressure sensor 400 before checking the air leakage. At this time, electric current is not supplied to the coil assembly 332 of the switching valve 300, and the atmosphere port 150 is communicated to the pump passage 162 through the canister port 140 and the orifice passage 510. Thus, the pressure, which is measured by the pressure sensor 400 arranged in the sensor chamber 170 that is communicated with the pump passage 162, becomes substantially the same as the atmospheric pressure. At this time, electric current is supplied only to the pressure sensor 400, and supply of electric current to the motor arrangement 220 and to the switching valve 300 is stopped. This state will be referred to as an atmospheric pressure sensing period or an atmospheric pressure sensing state A, as shown in FIG. 4.

(2) When the measurement of the atmospheric pressure is completed, an altitude of a location, at which the vehicle is currently stopped, is computed by the ECU 50 based on the measure atmospheric pressure. When the computation of the altitude is completed, supply of electric current to the coil assembly 332 of the switching valve 300 is initiated. Thus, the state is changed to a fuel vapor generation sensing state B shown in FIG. 4. When the electric current is supplied to the coil assembly 332 of the switching valve 300, the washer 342 is seated against the first valve seat 341, and the valve cap 352 is lifted away from the second valve seat 351. Thus, the communication between the atmosphere port 150 and the pump passage 162 is disconnected, and communication between the canister port 140 and the pump passage 162 is established via the path, which bypasses the orifice passage 510. As a result, the pump passage 162 is communicated with the fuel tank 20 through the canister 30, which is connected to the canister port 140. When fuel vapor is generated in the interior of the fuel tank 20, the pressure in the interior of the fuel tank 20 (i.e., the pressure of the fuel tank 20) becomes higher than the pressure (the atmospheric pressure) of a surrounding area around the vehicle, and the pressure, which is measured by the pressure sensor 400, is increased, as shown in FIG. 4.

Figure 4:
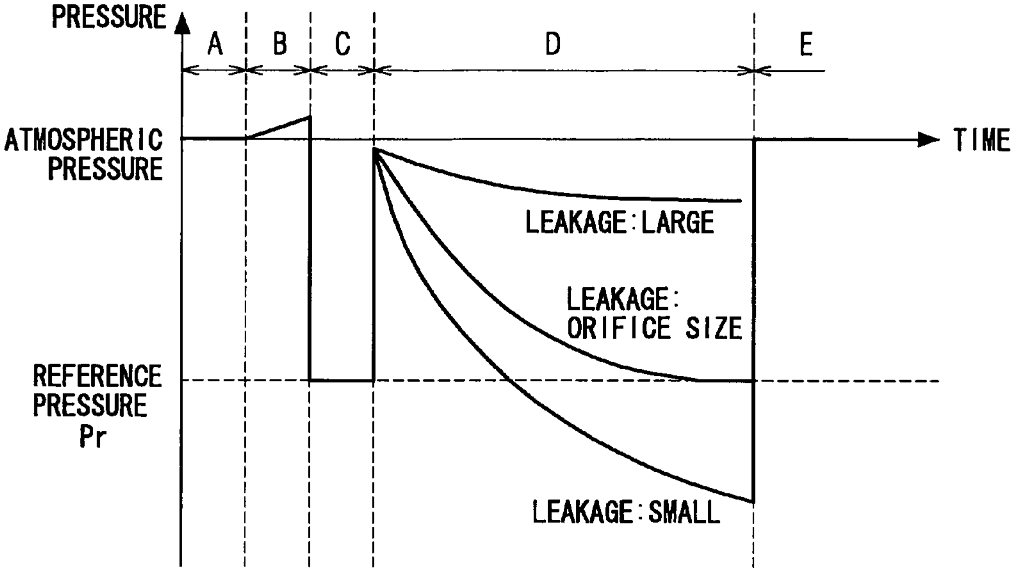
FIG. 4 is a graph showing a change in a pressure measured by a pressure sensor of the check module of the first embodiment with respect to time.

(3) When an increase in the pressure of the fuel tank 20 is sensed, supply of electric current to the coil assembly 332 of the switching valve 300 is stopped, and the state is changed to a reference pressure sensing state C shown in FIG. 4. When the supply of electric current to the coil assembly 332 is stopped, the washer 342 is lifted away from the first valve seat 341, and the valve cap 352 is seated against the second valve seat 351. Therefore, the canister port 140 and the atmosphere port 150 are communicated to one another, and the pump passage 162 is communicated with the canister port 140 and the atmosphere port 150 through the orifice passage 510. Thereafter, when supply of electric current to the coil assembly 227 of the motor arrangement 220 is initiated, the rotor 204 of the pump arrangement 202 is rotated. Thus, the check valve 230 is opened, and the pump passage 162 is depressurized. When the pump passage 162 is depressurized, the air, which is supplied from the atmosphere port 150 to the canister port 140, is supplied to the pump passage 162 through the orifice passage 510. Also, the air, which is supplied from the canister 30 to the canister port 140 and includes the fuel vapor, is supplied to the pump passage 162 through the orifice passage 510. The air, which is supplied to the pump passage 162, is throttled by the orifice 520 arranged in the orifice passage 510. Thus, as shown in FIG. 4, the pressure of the pump passage 162 drops. As discussed above, the inner diameter (an orifice size) of the orifice 520 is set to the predetermined size. Therefore, the pressure of the pump passage 162 drops to a predetermined pressure and is kept at the predetermined pressure. At this time, the pressure of the pump passage 162, which is measured by the pressure sensor 400, is stored as a reference pressure Pr in the RAM of the ECU 50. When the measurement of the reference pressure Pr is completed, supply of electric current to the motor arrangement 220 is stopped.

(4) When the measurement of the reference pressure Pr is completed, electric current is supplied to the coil assembly 332 of the switching valve 300. Thus, the state is changed to a depressurized state D shown in FIG. 4. When the electric current is supplied to the coil assembly 332 of the switching valve 300, the communication between the atmosphere port 150 and the pump passage 162 is disconnected, and communication between the canister port 140 and the pump passage 162 is achieved via the path, which bypasses the orifice passage 510. When the canister port 140 and the pump passage 162 are communicated to one another, the fuel tank 20 is communicated to the pump passage 162. Thus, the pressure of the fuel tank 20 substantially coincides with the pressure of the pump passage 162, and the pressure of the pump passage 162 is increased once again. When electric current is supplied to the coil assembly 227 of the motor arrangement 220, the rotor 204 of the pump arrangement 202 is rotated, and the check valve 230 is opened. Due to the rotation of the rotor 204, the interior of the fuel tank 20, which is communicated with the pump passage 162, is depressurized with time, as shown in FIG. 4.

When the pressure of the pump passage 162, i.e., the pressure of the fuel tank 20 decreases below the reference pressure Pr during the rotation of the rotor 204, it is determined that leakage of the air, which includes the fuel vapor, from the fuel tank 20 is within an allowable range. When the pressure of the fuel tank 20 decreases below the reference pressure Pr, air intrusion from the outside into the fuel tank 20 does not exist, or the air, which intrudes from the outside into the fuel tank 20, is equal to or below a flow rate of the air, which passes through the orifice 520. Thus, it is determined that the sufficient airtightness of the fuel tank 20 is achieved. In contrast, when the pressure of the fuel tank 20 does not decrease to the reference pressure Pr, it is assumed that the air leakage from the fuel tank 20 exceeds the allowable range. When the pressure of the fuel tank 20 does not decrease to the reference pressure Pr, it is assumed that the air is introduced into the fuel tank 20 at the time of depressurization of the interior of the fuel tank 20. Thus, it is assumed that the sufficient airtightness of the fuel tank 20 is not achieved. In the case where the sufficient airtightness of the fuel tank 20 is not achieved, when the fuel vapor is generated in the fuel tank 20, the air, which includes the fuel vapor, is released outside the fuel tank 20. When it is determined that the air leakage from the fuel tank 20 exceeds the allowable range, the ECU 50 lights a warning lamp (not shown) installed in a dashboard of the vehicle at the next operation of the engine. In this way, the leakage of the air, which includes the fuel vapor, from the fuel tank 20 is notified to the driver. When the pressure of the fuel tank 20 is substantially the same as the reference pressure Pr, the air leakage, which corresponds to the air flow rate of the orifice 520, exists at the fuel tank 20.

(5) When the check of air leakage is completed, the supply of electric current to the motor arrangement 220 and the switching valve 300 is stopped, and the state is changed to a determination complete state E shown in FIG. 4. The ECU 50 stops the supply of electric current to the pressure sensor 400 after the ECU 50 confirms that the pressure of the pump passage 162 is returned to the atmospheric pressure in a manner shown in FIG. 4. Thus, the ECU 50 ends the entire check process.

The structure, which connects between the mount 226 of the vane pump 200 and the casing 203 will be described.

Figure 5:
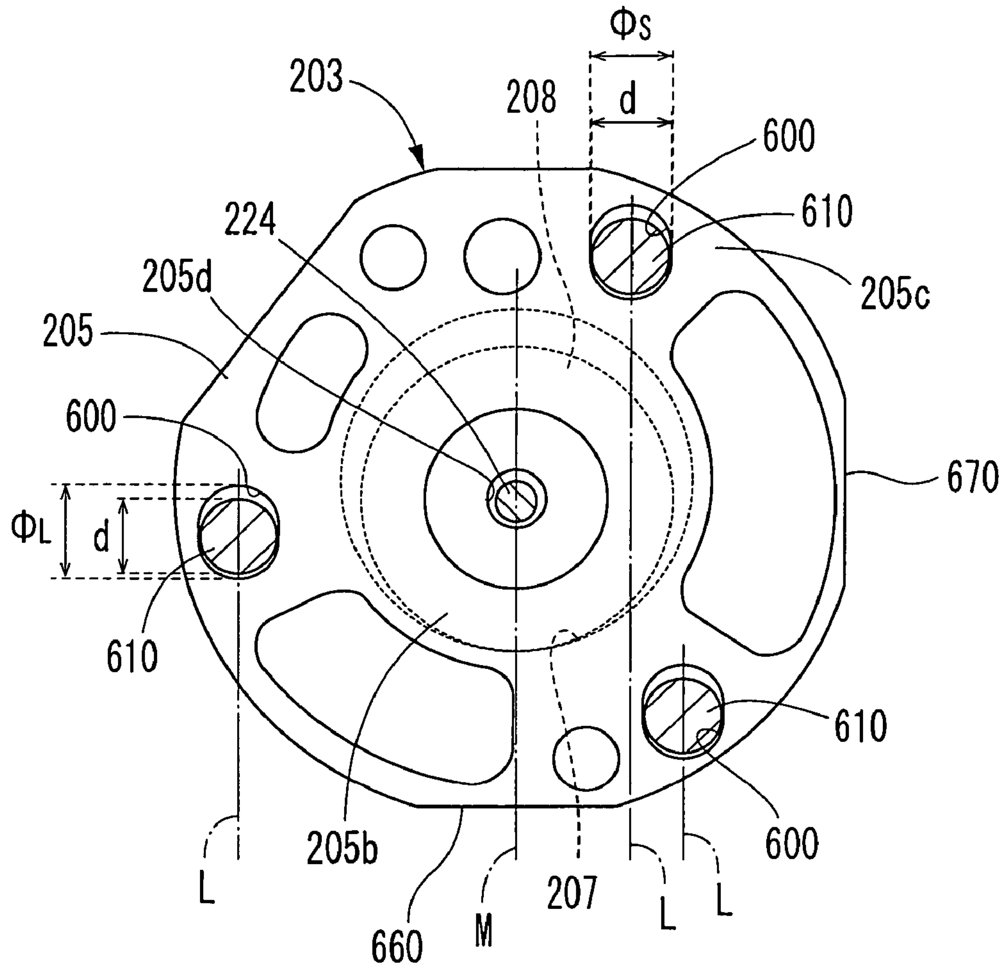
FIG. 5 is a cross sectional view of the vane pump along line V-V in FIG. 1.
Figure 6:
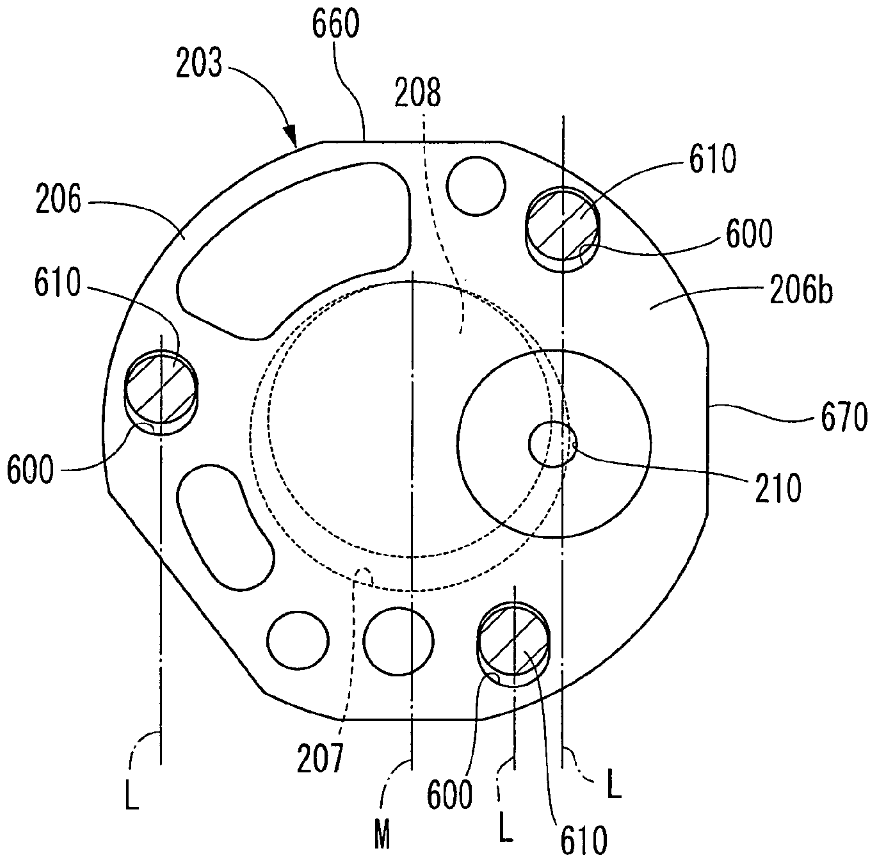
FIG. 6 is a cross sectional view along line VI-VI in FIG.
Figure 7:
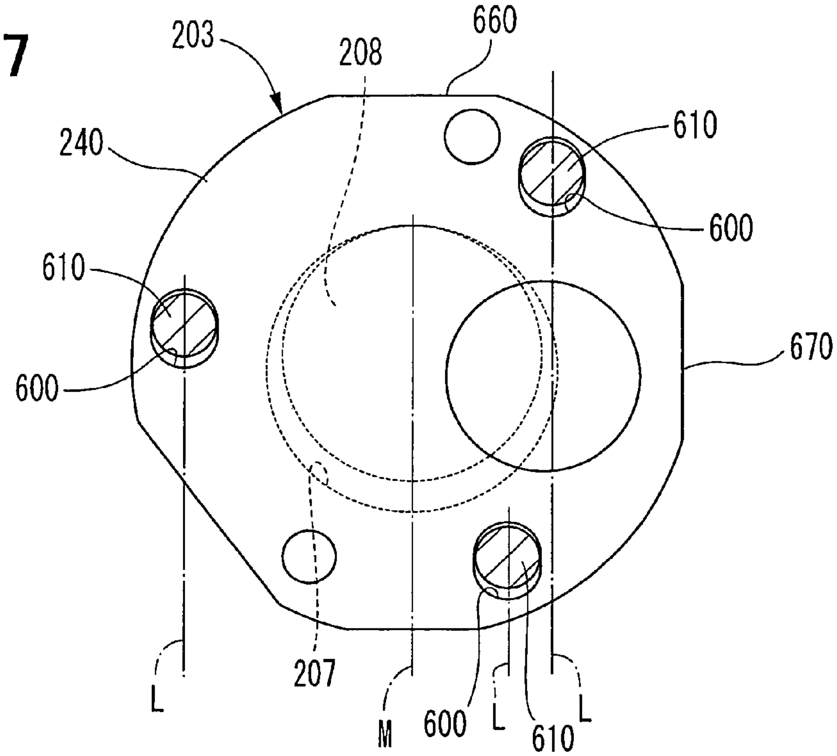
FIG. 7 is a cross sectional view along line VII-VII in FIG. 1.

As shown in FIGS. 1 and 5-7, the casing 203 has three elongated holes 600, each of which has an elongated cross section and receives a shank 610 of the corresponding one of the bolts 250. The three elongated holes 600 are arranged at generally equal angular intervals in the circumferential direction of the rotor shaft 208 and extend through the three constituent members 205, 206, 240, which constitute the casing 203. Each elongated hole 600 extends through the casing 203 in a direction parallel to the central axis O of the rotor shaft 208 at radially outward of the pump chamber 207. A major axial direction of each elongated hole 600, which extends along a major axis of the elongated cross section of the elongated hole 600, is oriented in a common direction and coincides with a direction of eccentricity of the rotor 204 relative to the pump chamber 207. Here, the direction of eccentricity of the rotor 204 relative to the pump chamber 207 is defined as a direction of displacement of the rotational center of the rotor 204 relative to the center of the pump chamber 207. In FIGS. 5-7, each dot-dash line L indicates the major axis of the elongated cross section of the corresponding elongated hole 600, and a dot-dash line M indicates the direction of eccentricity of the rotor 204 relative to the pump chamber 207. A minor axial length $\phi S$ of each elongated hole 600 is set to be slightly larger than an outer diameter d of the shank 610 of the corresponding bolt 250. In this way, the casing 203 holds (or clamps) the shank 610 of each bolt 250, which is received in the corresponding elongated hole 600, in a minor axial direction of the elongated hole 600, which extends along the minor axis of the elongated cross section of the elongated hole 600, to limit substantial movement of the bolt 250 in the minor axial direction of the elongated hole 600. A major axial length $\phi L$ of each elongated hole 600 is sufficiently larger than the outer diameter d of the shank 610 of the corresponding bolt 250 to allow movement of the casing 203 relative to the shanks 610 of the bolts 250 in the major axial direction of the elongated hole 600. Thus, when the bolts 250 are loosened, the casing 203 can be slid relative to the shanks 610 of the bolts 250 in the major axial direction of the elongated hole 600. Furthermore, as shown in FIGS. 1 and 5, in the first embodiment, a hole 205*d* of the base wall 205*b* of the cam ring 205, through which the rotatable shaft 224 is received, is formed as a cylindrical loose hole, so that the relative sliding movement of the casing 203 relative to the shanks 610 of the bolts 250 is not interfered by the hole 205*d* of the base wall 205*b*.

As shown in FIGS. 5-7, the casing 203 has two flat surface portions 660, 670 along an outer peripheral surface of the casing 203. The flat surface portion 660 extends in a direction perpendicular to each axial line L, which extends in the major axial direction of the corresponding elongated hole 600. The flat surface portion 670 extends in a direction parallel to each axial line L, which extends in the major axial direction of the corresponding elongated hole 600.

Figure 8:
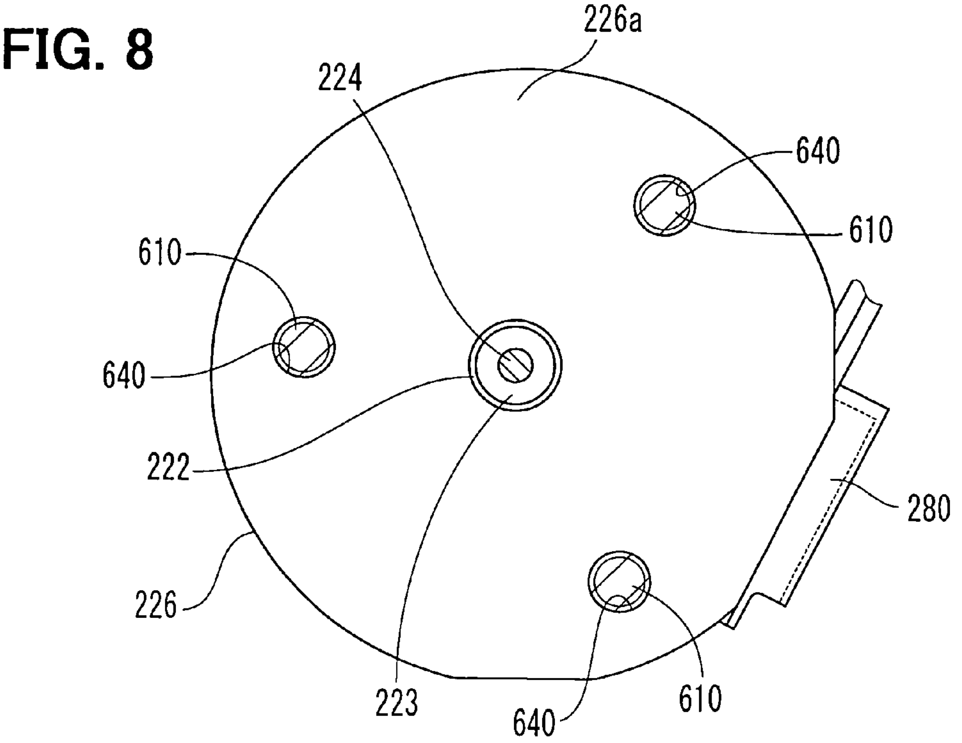
FIG. 8 is cross sectional view along line VIII-VIII in FIG. 1.

As shown in FIGS. 1 and 8, the mount 226 has three female threaded holes 640, each of which is threadably engaged with a corresponding one of the bolts 250. In the mount 226, the three female threaded holes 640 are arranged at generally equal angular intervals and are axially opposed to the three elongated holes 600, respectively, of the casing 203. Each female threaded hole 640 extends through the mount 226 in a thickness direction of the mount 226, which is parallel to the central axis O of the rotor shaft 208.

As shown in FIG. 1, the shank 610 of each bolt 250 is received through the corresponding elongated hole 600 from the first end side of the casing 203 in a direction generally parallel to the central axis O of the rotor shaft 208, and a distal end of the shank 610 of each bolt 250 is threadably engaged with the corresponding female threaded hole 640. In the state of FIG. 1 where the bolts 250 are tightened, the casing 203 is connected to the mount 226 in such a manner that the casing 203 is clamped between the head 612 of each bolt 250 and the mount 226.

Next, an assembling method of the vane pump 200 will be described.

(i) First, the motor arrangement 220 having the constituent components 222-226, 280 integrated therein, the rotor 204, the cam ring 205, the plate 206, the protective member 240, the three bolts 250 and the check valve 230 are prepared individually.

(ii) Then, the rotatable shaft 224 of the motor arrangement 220 is inserted through the base wall 205*b* of the cam ring 205 from the second end surface 205*c* side of the cam ring 205.

(iii) Next, the rotor shaft 208 of the rotor 204 is fitted to and is connected to the rotatable shaft 224, so that the rotor 204 is received in the pump chamber 207 of the cam ring 205. Therefore, the rotor 204 is held in the pump chamber 207, as shown in FIGS. 9A and 9B.

Figure 9A:
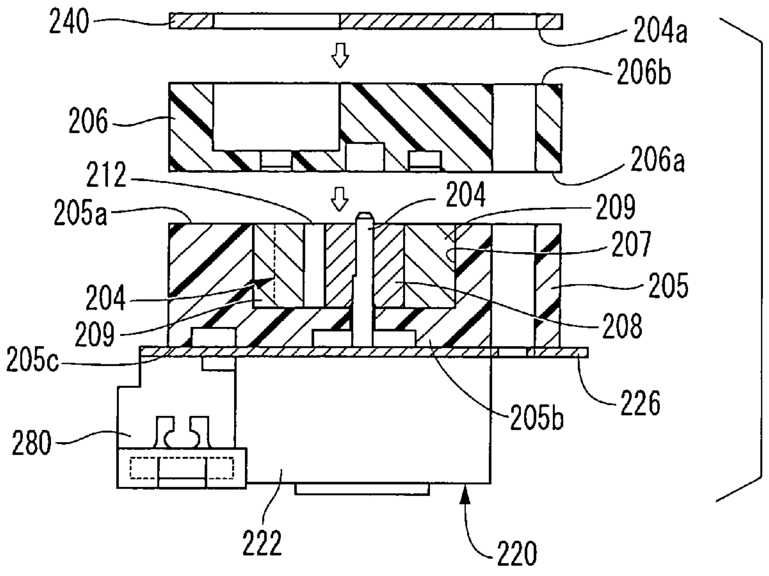
FIG. 9A is an exploded view showing an assembling method of the vane pump of the first embodiment.
Figure 9B:
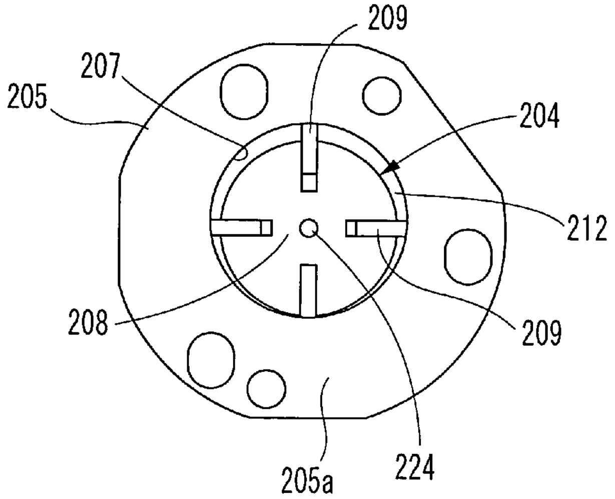
FIG. 9B is an end view of a cam ring of the vane pump of FIG. 9A.

(iv) Thereafter, as indicated by a blank arrow in FIG. 9A, the second end surface 206*a* of the plate 206 is placed over the first end surface 205*a* of the cam ring 205 to cover the opening 212 of the cam ring 205. Furthermore, the second end surface 240*a* of the protective member 240 is placed over the first end surface 206*b* of the plate 206. In this way, the plate (the cover member) 206 and the protective member 240 are placed over the cam ring 205 to form the casing 203.

(v) Next, the shanks 610 of the bolts 250 are inserted through the elongated holes 600, respectively, of the casing 203, and distal ends of the shanks 610 of the bolts 250 are threadably engaged with the female threads 640, respectively, of the mount 226 of the motor arrangement 220. At this time, each bolt 250 is in a temporarily fixed state, in which the bolt 250 is still loosened.

(vi) Then, the check valve 230 is fitted to and is installed to the intake opening 210 of the casing 203.

Figure 10A:
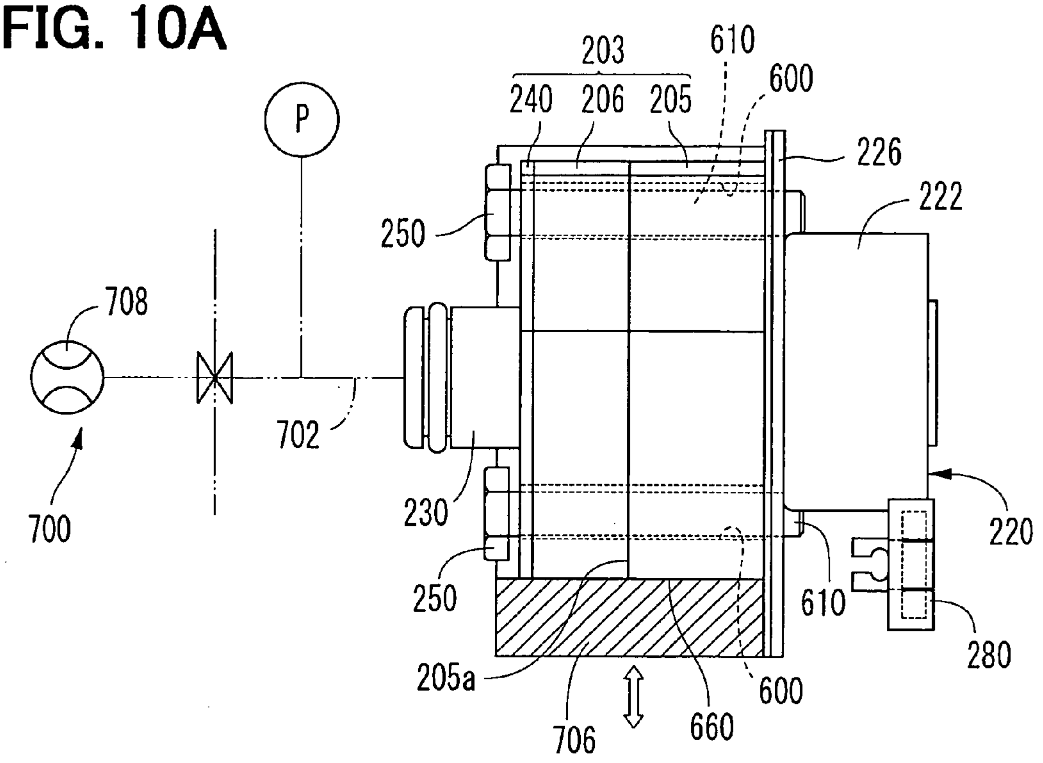
FIG. 10A s a schematic descriptive view for describing a method for adjusting a pump flow rate of the vane pump according to the first embodiment.
Figure 10B:
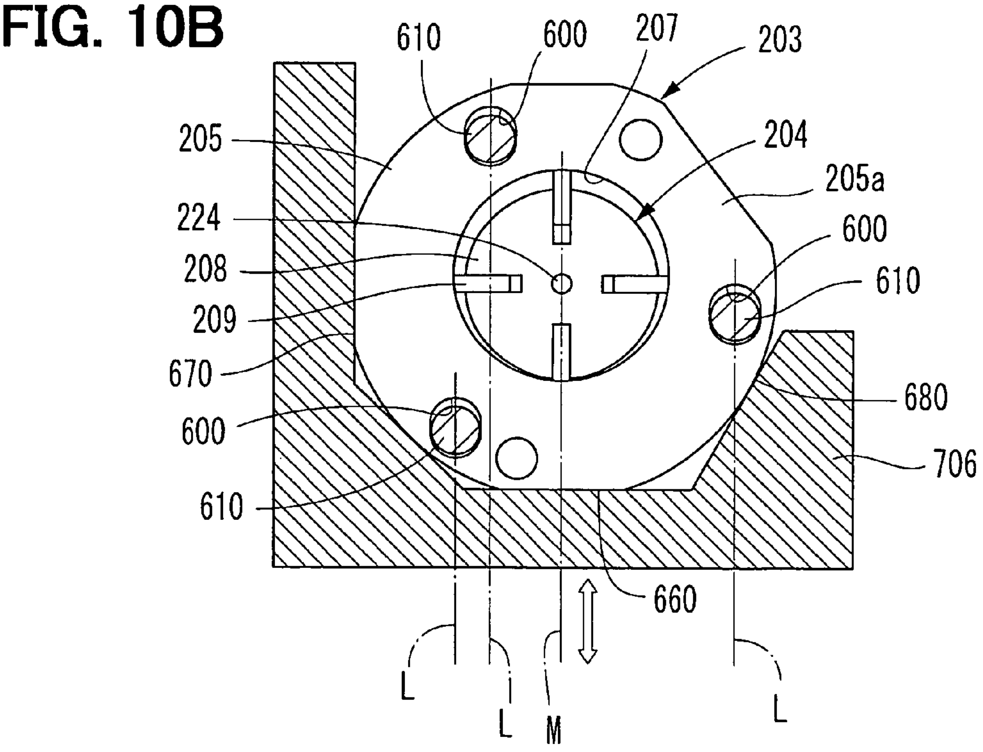
FIG. 10B is a schematic end view of the cam ring of the vane pump of FIG. 10A.

(vii) Thereafter, the pump flow rate is adjusted. Specifically, as shown in FIGS. 10A and 10B, a check passage 702 of an adjustment apparatus 700 is connected to the intake opening 210 of the casing 203 through the check valve 230, and a check circuit unit (not shown) of the adjustment apparatus 700 is connected to the control circuit unit 280 of the motor arrangement 220. Furthermore, the case member 222 of the motor arrangement 220 is secured by a first jig (not shown), and the casing 203 is held by a second jig 706 in a linearly reciprocable manner. At this time, the flat surface portion 660 of the casing 203 is vertically supported by the second jig 706, which has a U-shaped cross section and makes flat surface contact with the flat surface portion 660 of the casing 203. Also, the flat surface portion 670 of the casing 203 and an opposite point 680 of the casing 203, which is opposite from the flat surface portion 670, are clamped by the second jig 706. Then, the control circuit unit 280 is controlled by the check circuit unit to energize the coil assembly 227 of the motor arrangement 220, so that the rotatable shaft 224 is rotated. Therefore, measurement of the intake flow rate (the pump flow rate) of the fluid, which is taken through the intake opening 210, is initiated through a flow meter 708 of the adjustment apparatus 700 connected to the check passage 702. The measurement of the intake flow rate of the fluid by the flow meter 708 is performed continuously or intermittently, and at the same time, the second jig 706 is moved in the vertical direction, as indicated by a double-sided blank arrow in FIGS. 10A and 10B. Thus, while the intake flow rate of the fluid is measured, the casing 203 is slid relative to the mount 226, which is threadably engaged with the shanks 610 of the bolts 250, in the major axial direction of each elongated hole 600. When the measurement result of the intake flow rate through the flow meter 708 coincides with a required intake flow rate of the vane pump 200, the movement of the second jig 708 and the energization of the coil assembly 227 are both stopped. In this way, the relative position (hereinafter referred to as a casing relative position) of the casing 203 relative to the mount 226 is determined and is fixed, and thus the intake flow rate (the pump flow rate) is adjusted to a desired value.

(viii) Finally, the bolts 250 are tightened. Thus, the casing 203 and the mount 226 are tightly connected to one another while maintaining the predetermined positional relationship, which is determined in the above step (vii). Thus, the assembly of the vane pump 200 is completed. Then, the intake opening 210, the control circuit unit 280, the case member 222 and the casing 203 are removed from the check passage 702, the check circuit unit, the first jig and the second jig 706, respectively.

According to the first embodiment, at the time of assembly of the vane pump 200, the rotor 204 can be inserted into the cup-shaped cam ring 205 having the upwardly oriented opening 212 before the plate 206 and the protective member 240 are placed over the cam ring 205. In this way, the manufacturing of the casing 203, which receives the rotor 204, is eased, so that the time required to form the casing 203 can be shortened or minimized.

Furthermore, in the assembly of the vane pump 200, at the time of adjusting the pump flow rate, the direction of relative movement of the casing 203 relative to the mount 226 can be limited to the major axial direction of each elongated hole 600, which coincides with the direction of eccentricity of the rotor 204 relative to the pump chamber 207. Also, at the time of adjusting the pump flow rate, the case member 222 is secured by the first jig, and the casing 203 is moved by the second jig 706, which makes flat surface contact with the flat surface portion 660, in the vertical direction, i.e., in the major axial direction of each elongated hole 600. Thus, the casing relative position can be finely adjusted without rotating the casing 203 relative to the mount 226. As a result, according to the first embodiment, the casing relative position, which achieves the desired pump flow rate, can be more easily found in comparison to the previously proposed vane pump, in which the cylindrical loose holes are used in place of the elongated holes 600. Therefore, the time required to adjust the pump flow rate can be shortened.

As discussed above, according to the first embodiment, the manufacturing of the casing 203 and the adjustment of the pump flow rate can be accomplished within the short period of time. Thus, the total assembly time of the vane pump 200 and the manufacturing time of the fuel vapor leakage check module 100 can be shortened.

Furthermore, according to the first embodiment, the casing 203 is connected to the mount 226 by the three bolts 250, and the three through holes of the casing 203, which receive the bolts 250, respectively, are formed as the elongated holes 600. Thus, at the time of adjusting the pump flow rate, the adjustment time can be reduced through use of the elongated holes 600. Also, after the adjustment of the pump flow rate, the casing 203 can be secured to the mount 226 by tightening each bolt 250.

Second Embodiment

Figure 11:
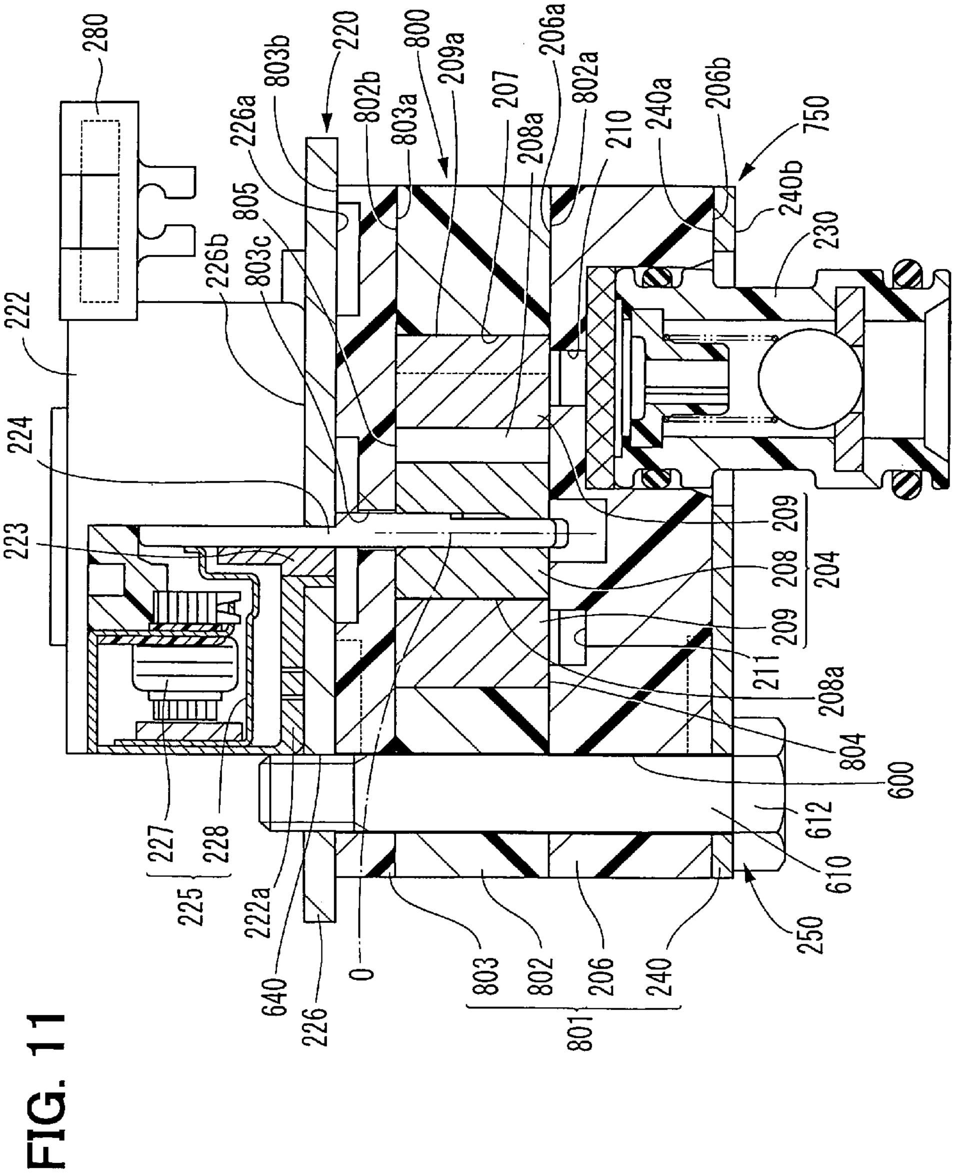
FIG. 11 is a cross sectional view of a vane pump according to a second embodiment.

A second embodiment of the present invention will be described. Components similar to those discussed in the first embodiment will be indicated by the same numerals and will not be described further. The following discussion is mainly focused on the dissimilar points, which differ from the first embodiment. FIG. 11 shows a vane pump 750 of the second embodiment.

A casing 801 of a pump arrangement 800 of the vane pump 750 includes a cam ring 802, a first plate (a first cover member) 803, a second plate (a second cover member) 206 and a protective member 240. The cam ring 802 is made of resin and is formed into a tubular body. The cam ring 802 includes opposed first and second openings 804, 805 in its first and second end surfaces **802*a*, 802*b* respectively, and defines a pump chamber 207 therein. The first opening 804 of the cam ring 802 is covered by the second plate 206 in such a manner that a second end surface 206*a* of the second plate 206, which is opposite from the protective member 240, makes flat surface contact with the first end surface 802*a* of the cam ring 802, in which the first end opening 804 is formed. The first plate 803 is made of resin and is formed as a thick flat plate. The second opening 805 of the cam ring 802 is covered by the first plate 803 in such a manner that a first end surface 803*a* of the first plate 803 makes flat surface contact with the second end surface 802*b* of the cam ring 802, in which the second opening 805** is formed.

Similar to the first embodiment, three elongated holes 600 penetrate through the four constituent members 802, 803, 206, 240, which constitute the casing 801. The four constituent members 802, 803, 206, 240 are held together and are connected to the mount 226 by the bolts 250, which are received through the elongated holes 600, respectively. In this way, the second end surface **803*b* of the first plate 803, which is opposite from the cam ring 802, makes flat surface contact with the first end surface 226*a* of the mount 226. Furthermore, the other end of the rotatable shaft 224, which is opposite from the bearing 223, penetrates through the first plate 803 and is securely connected to the rotor shaft 208 of the rotor 204 arranged between the first plate 803 and the second plate 206. In the second embodiment, a hole 803*c* of the first plate 803, through which the rotatable shaft 224 is received, is formed as a cylindrical loose hole, so that the relative sliding movement of the casing 801 relative to the shanks 610 of the bolts 250 is not interfered by the hole 803c of the first plate 803**.

Next, an assembling method of the vane pump 750 will be described.

(I) First, the motor arrangement 220, the rotor 204, the cam ring 802, the first plate 803, the second plate 206, the protective member 240, the three bolts 250 and the check valve 230 are prepared individually.

(II) Then, the rotatable shaft 224 of the motor arrangement 220 is inserted through the first plate 803 from the second end surface 803b side of the first plate 803.

Figure 12:
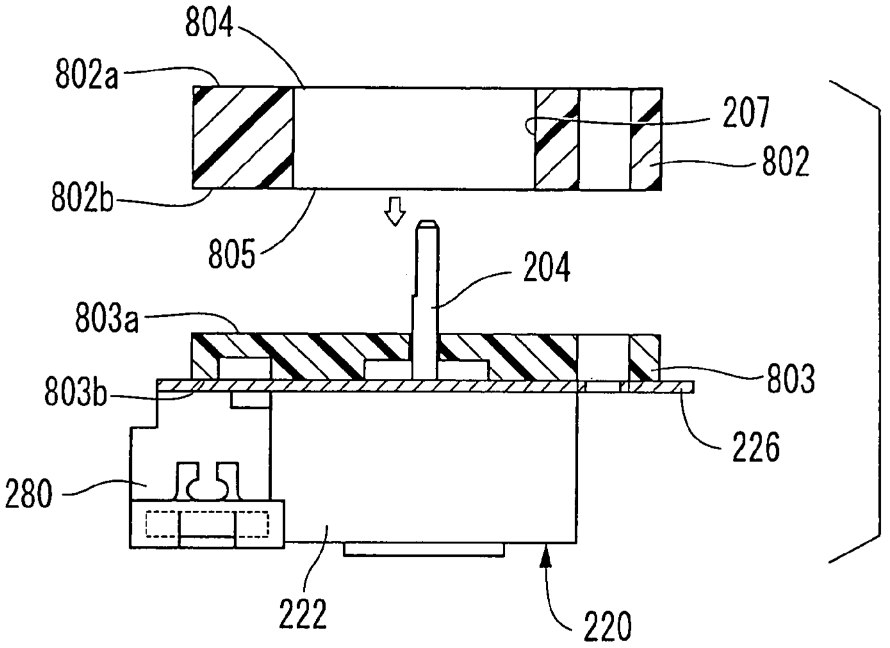
FIG. 12 is an exploded view showing an assembling method of the vane pump of the second embodiment.

(III) Next, as indicated by a blank arrow in FIG. 12, the second end surface 802b of the cam ring 802 is placed over the first end surface 803a of the first plate 803, which has been set such that the rotatable shaft 224 penetrates through the first plate 803 from the lower side of the first plate 803. In this way, as indicated in FIG. 13A, the cam ring 802 is placed over the first plate 803 to close the second opening 805 of the cam ring 802, and the first opening 804 of the cam ring 802 is oriented upwardly.

(IV) Next, the rotor shaft 208 of the rotor 204 is fitted to and is connected to the rotatable shaft 224, so that the rotor 204 is received in the pump chamber 207 of the cam ring 802. Therefore, the rotor 204 is held in the pump chamber 207, as shown in FIGS. 13A and 13B.

Figure 13A:
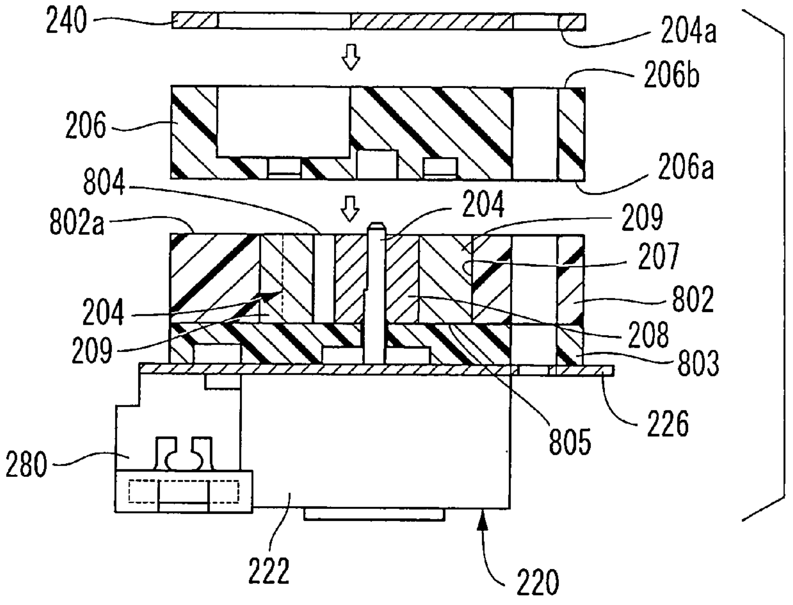
FIG. 13A is another exploded view showing the assembling method of the vane pump of the second embodiment.
Figure 13B:
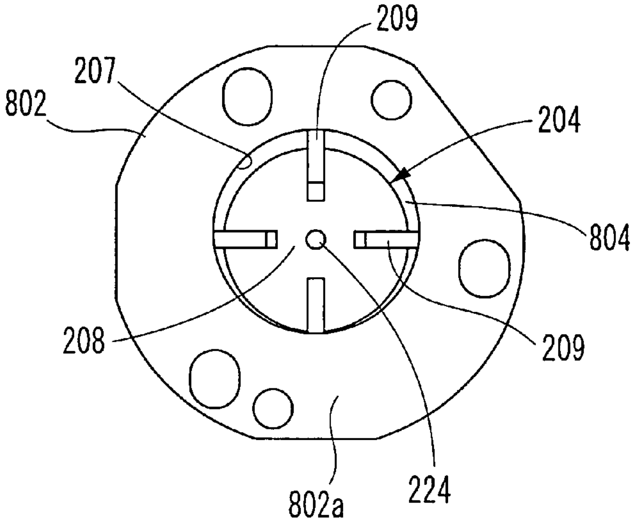
FIG. 13B is a schematic end view of the cam ring of the vane pump of FIG. 13A.

(V) Thereafter, as indicated by a blank arrow in FIG. 13A, the second end surface 206a of the plate 206 is placed over the first end surface 802a of the cam ring 802 to cover the first opening 804 of the cam ring 802. Furthermore, the second end surface 240a of the protective member 240 is placed over the first end surface 206b of the second plate 206. In this way, the second plate (the second cover member) 206 and the protective member 240 are placed over the cam ring 802, which is arranged on the cam ring 802, to form the casing 801.

(VI) Then, the steps similar to the steps (v), (vi), (vii) and (viii) of the first embodiment are performed. Thus, the assembly the vane pump 750 is completed.

According to the second embodiment, at the time of assembly of the vane pump 750, similar to the first embodiment, the adjustment time of the pump flow rate is shortened or minimized. After the adjustment of the pump flow rate, the bolts 250, which have been inserted through the elongated holes 600, are tightened, so that the casing 801 is secured to the mount 226. Particularly, the shortening of the adjustment time of the pump flow rate can shorten the total assembly time of the vane pump 750 and the manufacturing time of the fuel vapor leakage check module 100, which has the vane pump 750.

In the first and second embodiments, the present invention is embodied in the check system, which checks air leakage through depressurization of the interior of the fuel tank. However, it should be noted that the present invention is equally applicable to a check system, which checks air leakage through pressurization of the interior of the fuel tank. Also, the present invention is equally applicable to various known system, which depressurizes or pressurizes fluid.

Furthermore, in the first and second embodiments, the intake flow rate of the vane pump 200, 750, which is used for depressurization, is adjusted as the pump flow rate. However, for example, in a case where the vane pump 200, 750 is used for pressurization, the discharge flow rate of the vane pump 200, 750 can be adjusted as the pump flow rate.

In the first and second embodiments, the elongated hole 600 provides a relatively small space between the bolt 250 and an inner peripheral edge of the elongated hole 600 in comparison to the cylindrical loose hole of the previously proposed vane pump. This allows more effective spreading of stress applied to the inner peripheral edge of the elongated hole 600 in comparison to the cylindrical loose hole of the previously proposed vane pump to minimize occurrence of chipping or cracking of the inner peripheral edge of the elongated hole 600 in, for example, the cam ring 205 of the first embodiment or the first plate 803 of the second embodiment upon application of stress from, for example, the mount 226.

Additional advantages and modifications will readily occur to those skilled in the art. The invention in its broader terms is therefore not limited to the specific details, representative apparatus, and illustrative examples shown and described.

What is claimed is:

1. A vane pump comprising:

a motor arrangement that includes:

a rotatable shaft; and a support that rotatably supports the rotatable shaft;

a rotor that includes a plurality of vanes and is connected to the rotatable shaft;

a casing that includes:

a pump chamber, which receives the rotor in such a manner that the rotor is eccentric to the pump chamber; and at least one elongated hole, each of which penetrates through the casing in a direction parallel to the rotatable shaft and has an elongated cross section, wherein a major axis of the elongated cross section of each of the at least one elongated hole extends in a direction of eccentricity of the rotor relative to the pump chamber; and at least one male threaded screw member, each of which is received through a corresponding one of the at least one elongated hole of the casing and each of which is threadably engaged with the support to connect the casing to the support, wherein the casing holds each of the at least one male threaded screw member in a minor axial direction of the elongated cross section of a corresponding one of the at least one elongated hole to limit substantial movement of the male threaded screw member in the minor axial direction of the corresponding one of the at least one elongated hole.

2. The vane pump according to claim 1, wherein:

the at least one elongated hole of the casing includes a plurality of elongated holes; and the major axis of the elongated cross section of each of the plurality of elongated holes extends in a common direction.

3. The vane pump according to claim 1, wherein:

the casing includes a flat surface portion in an outer peripheral surface of the casing; and the flat surface portion of the casing extends in a direction perpendicular to the major axis of the elongated cross section of each of the at least one elongated hole.

4. The vane pump according to claim 1, wherein:

the casing includes:

a cam ring that has an opening at a first end of the cam ring and a base wall at a second end of the cam ring that is opposite from the first end of the cam ring, wherein the pump chamber is defined in the cam ring and is communicated with the opening of the cam ring; and a cover member that covers the opening of the cam ring; and the rotatable shaft penetrates through the base wall of the cam ring and is connected to the rotor, which is received in the pump chamber.

5. The vane pump according to claim 1, wherein:

the casing includes:

a cam ring that has first and second openings at opposed first and second ends, respectively, of the cam ring, wherein the pump chamber is defined in the cam ring and is communicated with both the first and second openings of the cam ring;

a first cover member that covers the second opening of the cam ring; and a second cover member that covers the second opening of the cam ring; and the rotatable shaft penetrates through the first cover member and is connected to the rotor, which is received in the pump chamber.

6. A method for adjusting a pump flow rate of the vane pump recited in claim 1, the method comprising:

monitoring the pump flow rate of the vane pump and, at the same time, moving the casing relative to the support in a state where the at least one male threaded screw member is loosened; and determining a position of the casing relative to the support based on a result of the monitoring of the pump flow rate of the vane pump.

7. A fuel vapor leakage check module for checking leakage of fuel vapor from a fuel tank, the fuel vapor leakage check module comprising the vane pump recited in claim 1, wherein the fuel vapor leakage check module checks leakage of fuel vapor from the fuel tank through depressurization or pressurization of an interior of the fuel tank by the vane pump.

* * * * *